United States Patent
Arnold et al.

(10) Patent No.: US 11,287,833 B2
(45) Date of Patent: Mar. 29, 2022

(54) FLOOR PROCESSING DEVICE THAT AUTOMATICALLY MOVES WITHIN AN ENVIRONMENT

(71) Applicant: Vorwerk & Co. Interholding GmbH, Wuppertal (DE)

(72) Inventors: Hans-Peter Arnold, Kierspe (DE); Thomas Buening, Bochum (DE); Benjamin Fleczok, Essen (DE); Robert Frielinghaus, Bochum (DE); Martin Helmich, Duisburg (DE); Lorenz Hillen, Wuppertal (DE); Christian Holz, Dortmund (DE); Gerhard Isenberg, Cologne (DE); Andrej Mosebach, Bochum (DE); Roman Ortmann, Duisburg (DE); Kevin Schmitz, Duesseldorf (DE); Fabian Vitz, Wuppertal (DE); Niklas Van Teeffelen, Duesseldorf (DE); Uwe Kemker, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 235 days.

(21) Appl. No.: 16/541,438

(22) Filed: Aug. 15, 2019

(65) Prior Publication Data
US 2020/0064858 A1   Feb. 27, 2020

(30) Foreign Application Priority Data

Aug. 23, 2018  (DE) .................... 10 2018 120 577.5

(51) Int. Cl.
*G05D 1/02*   (2020.01)
*G01C 21/30*  (2006.01)
(Continued)

(52) U.S. Cl.
CPC ............ *G05D 1/0274* (2013.01); *A47L 9/009* (2013.01); *B25J 11/0085* (2013.01); *G01C 21/30* (2013.01);
(Continued)

(58) Field of Classification Search
CPC .............. G05D 1/0274; G05D 1/0221; G05D 2201/0203; G05D 1/0236; G05D 1/024;
(Continued)

(56) References Cited

U.S. PATENT DOCUMENTS

2015/0217449 A1* 8/2015 Meier ................. G05B 13/027
  700/257
2018/0215039 A1* 8/2018 Sinyavskiy .......... G05D 1/0274

FOREIGN PATENT DOCUMENTS

| DE | 10 2008 014 912 A1 | 9/2009 |
|---|---|---|
| DE | 10 2011 000 536 A1 | 8/2012 |
| EP | 2 252 190 B1 | 5/2012 |

* cited by examiner

*Primary Examiner* — Bao Long T Nguyen
(74) *Attorney, Agent, or Firm* — Collard & Roe, P.C.

(57) ABSTRACT

A floor processing device automatically moves within an environment, with a driving attachment, a floor processing unit, an obstacle detection unit, a control unit and a detection unit for detecting device parameters and/or environment parameters control unit is set up to determine an error of the floor processing device based upon the detected parameters that prevents the floor processing device from moving and/or the floor processing device from processing a surface to be processed in such a way that the floor processing device is unable to automatically extricate itself from the error situation. The control unite is set up to analyze the parameters detected by the detection unit with respect to recurring patterns that have a repeatedly encountered combination of an error and at least one chronologically preceding environment and/or device parameter.

6 Claims, 6 Drawing Sheets

(51) Int. Cl.
*A47L 9/00* (2006.01)
*B25J 11/00* (2006.01)

(52) U.S. Cl.
CPC ........ *G05D 1/0221* (2013.01); *A47L 2201/04* (2013.01); *G05D 2201/0203* (2013.01)

(58) Field of Classification Search
CPC .. G05D 1/0242; G05D 1/0253; G05D 1/0255; G05D 1/0223; G05D 1/0276; G05D 1/0088; G05D 1/0214; B25J 9/163; B25J 9/1666; B25J 9/1676; B25J 11/0085; A47L 9/009; A47L 2201/04; A47L 9/2831; A47L 11/24; A47L 11/4061; A47L 11/4011; G01C 21/30
See application file for complete search history.

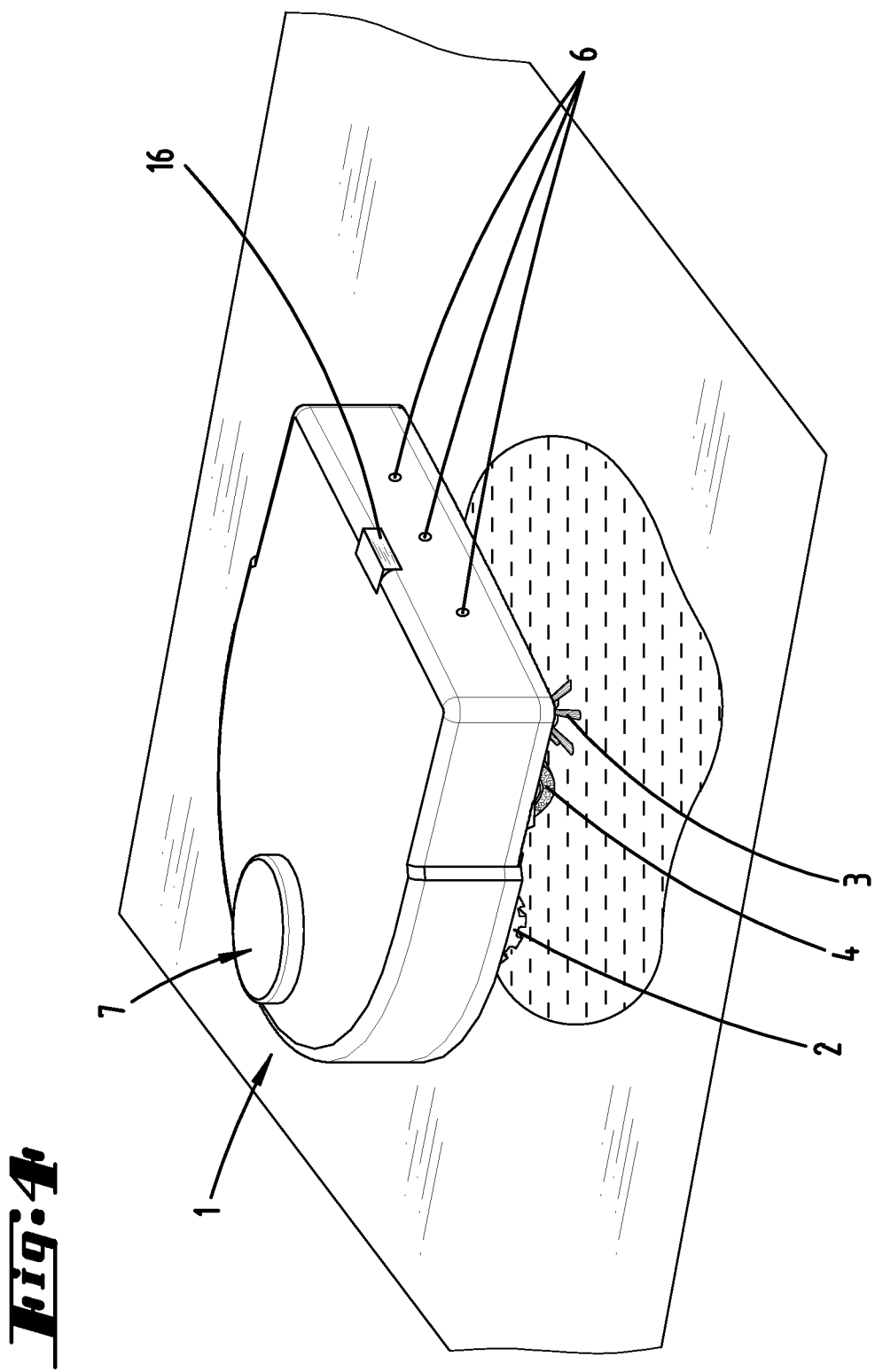

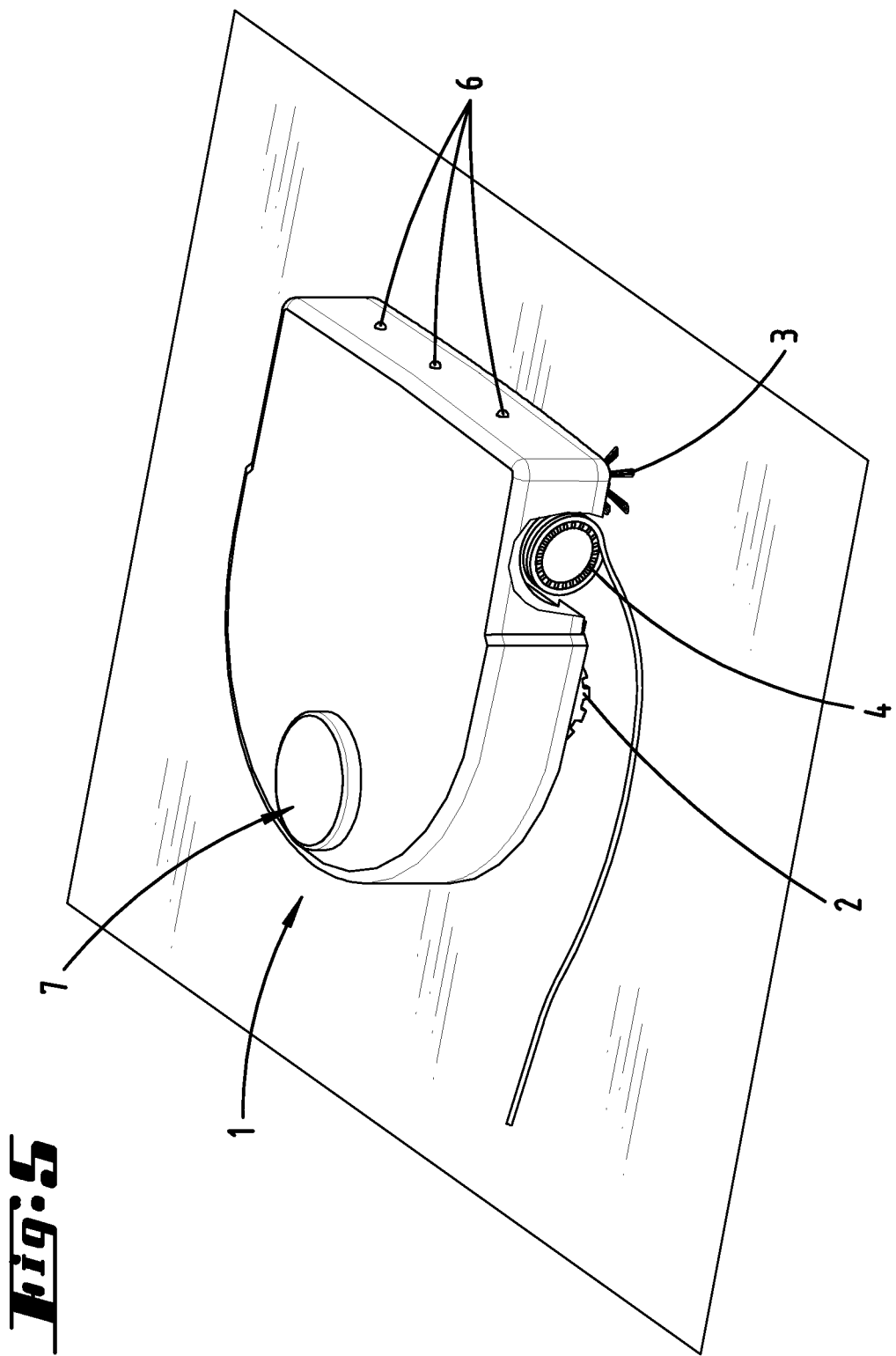

Fig. 6

| Parameter Device / Environment | Imminent Error | Time | Location | Change in operation |
|---|---|---|---|---|
| Detection unit (10): Overrunning of drive unit (2)  Detection unit (11): Inclined position | Drive unit (2) has no floor contact | Random | Dining room in area of dining set | Change planned route |
| Detection unit (11): Bumping of floor processing device (1)  Detection unit (12): Power consumption by floor processing unit rises continuously | Cable wound around floor processing unit (4) | Random | Living room in area of speakers | Avoid area |
| Detection unit (9): Vacuum in suction channel rises  Detection unit (12): Power consumption by floor processing unit (4) rises | Items of clothing siphoned into suction channel (15) | Daily, in the morning | Nursery | Start cleaning run later |

FLOOR PROCESSING DEVICE THAT AUTOMATICALLY MOVES WITHIN AN ENVIRONMENT

CROSS REFERENCE TO RELATED APPLICATIONS

Applicant claims priority under 35 U.S.C. § 119 of German Application No. 10 2018 120 577.5 filed Aug. 23, 2018, the disclosure of which is incorporated by reference.

BACKGROUND OF THE INVENTION

1. Field of the Invention

The invention relates to a floor processing device that automatically moves within an environment, with a driving attachment for moving the floor processing device in the environment, a floor processing unit for executing a floor processing operation, an obstacle detection unit for detecting obstacles in the environment, a control unit for automatically navigating and self-localizing the floor processing device and a detection unit for detecting device parameters and/or environment parameters, wherein the control unit is set up to determine an error of the floor processing device based upon the detected parameters that prevents the floor processing device from moving and/or the floor processing device from processing a surface to be processed in such a way that the floor processing device is unable to automatically extricate itself from the error situation.

In addition, the invention relates to a method for operating a floor processing device that automatically moves within an environment, wherein the floor processing device is moved in the environment by a driving attachment, wherein the floor is processed by means of a floor processing unit, wherein an obstacle detection unit detects obstacles in the environment, wherein the floor processing device automatically navigates and localizes itself in the environment by means of a control unit, and wherein a detection unit detects device parameters and/or environment parameters, and wherein the control unit determines an error of the floor processing device based upon the detected parameters that prevents the floor processing device from moving and/or the floor processing device from processing a surface to be processed in such a way that the floor processing device is unable to automatically extricate itself from the error situation.

2. Description of the Related Art

Floor processing devices of the aforementioned kind are known in prior art in a plurality of different embodiments. For example, the floor processing devices can be cleaning devices, polishing devices, lawnmowers or others. In particular, the automatically moving floor processing device can be designed in the form of a mobile vacuuming and/or wiping robot.

Publications DE 10 2011 000 536 A1 and DE 10 2008 014 912 A1 disclose automatically movable robots for cleaning floors. The robots are equipped with distance sensors, which can measure distances to obstacles, for example pieces of furniture or spatial boundaries. An area map is generated from the measured distance data, based upon which a movement route can be planned that avoids a collision with obstacles. The distance sensors preferably operate without contact, for example with the assistance of light and/or ultrasound. Further known is to provide the robot with means for all-round distance measurement, for example with an optical triangulation system, which is arranged on a platform that rotates around a vertical axis or the like. The acquired distance data to obstacles are processed into an area map by means of a computing device of the robot and stored, so that the robot can retrieve this area map during the course of an operation, so as to orient itself within the environment.

Further known in prior art, for example from EP 2 252 190 B1, is that a floor processing robot stores a plurality of locations within an environment and executes a floor processing activity at the latter, wherein a floor processing frequency is tracked at each location. Work routines are adjusted or tailored so as to be able to optimally process all locations, for example wherein locations used more frequently by people are processed more frequently than less used locations. The robot can have one or several sensors that recognize its location and/or the position of obstacles. For example, the robot can here also determine that it is located underneath a piece of furniture, so as to then use a different floor processing pattern.

The disadvantage to the aforementioned automatically moving floor processing devices is that they always continue to approach locations in the environment again even when a malfunction of the floor processing device or an inadvertent termination of the floor processing activity has taken place there in the past. The floor processing device is not set up to prevent such situations from the very outset.

SUMMARY OF THE INVENTION

Proceeding from the aforementioned prior art, it is thus the object of the invention to design the floor processing device in such a way that it acts predictively while navigating within the environment, so as to prevent in advance error situations from which it cannot automatically extricate itself and/or which prevent a continued processing of the surface to be processed.

In order to achieve the aforementioned object, it is proposed that, for purposes of a self-learning error avoidance, the control unit of the floor processing device be set up to analyze the parameters detected by means of the detection unit with respect to recurring patterns, which are characterized by a repeatedly encountered combination of an error and at least one chronologically preceding environment and/or device parameter.

According to the invention, the floor processing device thus has a self-learning function for predictively preventing error situations. To this end, the data recorded by one or several detection units of the floor processing device, i.e., the detected parameters of the environment and/or floor processing device, are stored and/or analyzed, so that given a renewed occurrence of an identical error case, an analysis of the situation can be performed within a defined timeframe before the error arises. The detection unit is set up to detect current measured values and/or settings of sensors and/or actuators of the floor processing device. The data thus available to the control unit are used for purposes of analyzing error situations and generating a prediction as to how such an error situation can be prevented during future floor processing operations and/or movements of the floor processing device. For example, not just individual values for environment parameters and/or device parameters can here be analyzed, but rather a chronological progression of the parameters prior to the occurrence of an error situation as well. The data of the detection unit are analyzed for recurring patterns with methods involving artificial intelligence, so as to be able to predict an error situation in the future. For example, a neuronal network can be trained, e.g., with so-called "machine learning" methods. After the error detection unit has determined an error, the cause that led to the occurrence of the error can be determined by analyzing the sensor and/or actuator values of the floor processing device. If an error occurs again at a later time, the newly recorded data of the detection unit are used to improve an error forecast. The overall autonomy of the floor processing device is thus improved, since a complete cleaning of the environment, for example of a home, can be ensured without an error situation arising once again. The floor processing device can be reliably prevented from terminating an operation, which would make it necessary to reactivate it through a manual intervention by a user.

It is proposed that the detected errors and preceding environment and/or device parameters in combination with information about a position of the floor processing device in the environment and/or with time information be detected and stored. The detected errors and environment and/or device parameters are thus combined with location and/or time information and stored, so that the control unit can consider where and/or when a respective environment parameter and/or device parameter and/or error was detected. The environment parameters, device parameters and/or errors can be detected continuously or at defined, in particular equidistant, times. A memory of the floor processing device can contain a database, in particular a table stored therein, with detected parameters and errors allocated to specific locations and times. If an identical or similar error of the floor processing device occurs later at the same location in the environment and/or at the same time, for example times of day, days of the week or the like, it can be checked whether the same environment and/or device parameters of the floor processing device were on hand before or during the occurrence of the error. This further develops the self-learning function of the floor processing device, and prevents the same error from occurring in the future.

It is further proposed that the control unit be set up to analyze the data with regard to recurring combinations of environment and/or device parameters recorded chronologically before and/or during the occurrence of an error and ensuing errors, and upon detection of a recurring combination to store the latter as a reference pattern. In order for a combination of a specific error and environment and/or device parameters to be defined as a reference pattern and stored, this constellation must have already been encountered beforehand during the movement and/or floor processing of the floor processing device. The patterns arising in an error case can thus be stored as a reference pattern given a repeated, at least twofold, occurrence. A reference pattern preferably contains at least one detected environment parameter and/or device parameter and an error that arose in conjunction with this environment and/or device parameter. During continued movements and/or processing activities of the floor processing device, the then currently recorded data, i.e., parameters, are compared with the defined reference patterns, and given a correlation or major similarity, it is determined that an error will soon occur if measures are not taken to avoid the error. In addition to linking the information about environment/device parameters and errors, a stored reference pattern can also contain additional information, for example specifically indications about a location of the floor processing device during the detection of the respective parameter and/or about a time at which the parameter was detected. For example, a reference pattern can contain a data set with a time of day, the whereabouts of the floor processing device in the environment, a speed of the driving attachment of the floor processing device measured at this time and at this location, and an error that occurred in the situation, for example a blocking of the driving attachment. If the control unit now determines that the floor processing device is currently at the same location in the environment and the same value is present for the respective device parameter, specifically the same level of speed for the driving attachment, it can be concluded that the same error, specifically a blocking of the driving attachment, will shortly occur. The device parameter is here especially preferably detected not only at a single point in time, but rather over a chronological progression, i.e., over a specific timespan, for example. As a result, it can be determined that, over the course of time, specifically during the floor processing or movement of the floor processing device, the detected device parameter moves in the direction of the value corresponding to the value of the device parameter at the time the error occurs. If an error occurs repeatedly, the newly recorded data can be used to improve the forecast, i.e., the reference pattern. This improvement can take place automatically within the framework of regular operating activity. Alternatively, it is also possible that the user manually bring the floor processing device into a critical, i.e., error-prone, situation, thereby provoking the occurrence of an error, and the predictive algorithm of the floor processing device can learn and improve the reference pattern.

In this sense, it is thus suggested that the control unit also be set up to compare parameters detected during an ensuing floor processing and/or movement of the floor processing device with stored reference patterns, so as to prevent an imminent error of the floor processing device through corresponding measures.

It is further proposed that the control unit be self-learning in design, so as to, given a match between currently detected parameters and a reference pattern, automatically control a change in operation of the floor processing device to prevent an otherwise imminent error and/or to control an output of information about the imminent error to a user to enable a manual action. According to the embodiment mentioned first, the control unit of the floor processing device automatically effects a change in operation of the floor processing device to prevent the occurrence of an otherwise shortly imminent error according to the detected parameters. In the second mentioned case, the control unit does not automatically change the operation of the floor processing device, but rather first outputs information to a user of the floor processing device, for example via a display of the floor processing device or also via an external terminal having a communications link with the floor processing device. The output information can tell the user which errors of the floor processing device could occur and possibly where the floor processing device is located at the present time and/or how large a timespan there is before an error could occur. The user preferably receives a notification of what he or she can do to avert the error, i.e., which change in the operation of the floor processing device the user must make or set. The selection and/or input by the user can be stored and used given a repeated error case to circumvent the error. For example, a user input can involve manually teaching the floor processing device, in which the user manually moves the floor processing device or controls it by means of a remote control. In like manner, inputs can be made in an area map shown on a display or by means of gestures and/or speech. Device parameters and/or predefined error avoidance strategies can be manually relayed to the floor processing device.

It is proposed that the detection unit be set up to detect one or several environment and/or device parameters, selected from the following group: Movement route of the floor processing device, setting and/or operating status of a floor processing unit and/or the obstacle detection unit, power consumption of an electric motor that drives the driving attachment and/or floor processing unit, rotational angle and/or rotational speed of the driving attachment, spatial orientation and/or inclination of the floor processing device, ambient temperature, ambient humidity, operating temperature of an electric motor and/or a floor processing unit of the floor processing device, pressure within a suction channel of the floor processing device and/or ambient pressure. It goes without saying that additional environment and/or device parameters can be detected if the floor processing device has detection units with suitable sensors for this purpose. For example, the sensors for detecting the environment/device parameter can comprise a current measuring unit, a rotational angle transducer, a speedometer, an infrared sensor, an ultrasound sensor, a contact sensor, a gyroscope, an acceleration sensor, an IMU unit, a camera, a pressure sensor, a moisture sensor among others.

According to preferred embodiments of the invention, the control unit of the floor processing device can be set up to detect one or several errors selected from the following group: Blocking or overrunning of the driving attachment and/or floor processing unit, blocking of a suction channel, lifting of a partial area of the floor processing device from a surface to be processed, immobilization of the floor processing device in the environment. The aforementioned errors are all the kind that create a situation from which the floor processing device cannot automatically extricate itself and/or which makes it impossible to further process the surface to be processed. Involved here are errors that permanently disable the function of the floor processing device necessary for floor processing if the corresponding error is not eliminated.

With respect to the measures for eliminating the error, it is proposed that the control unit be set up to control one or more changes in operation of the floor processing device to prevent an otherwise imminent error, selected from the following group: Avoiding a specific area of the environment, delaying the time of entry into a specific area of the environment, moving in reverse along a previously traversed movement route, changing a planned movement route, stopping a driven floor processing unit, changing a direction of movement and/or power consumption of a floor processing unit. In this sense, the floor processing device can be allowed to briefly travel in reverse or the like given an overrunning of a wheel of the driving attachment, for example a change in the movement route. In the event that the floor processing device is moving according to a predefined cleaning plan and/or on a prescribed movement route, the latter can also be changed so as to avoid the error. If the change in operation entails exiting the predefined movement route, the floor processing device can swing back into the movement route after circumventing an error-prone location within the environment, for example. If an imminent error is reported by a forecast, it can also be prevented depending on the situation by having the floor processing device leave out the accompanying area of the environment during a current processing operation, i.e., not even approach it, and only having it approach the area once the rest of the environment has been cleaned, by allowing the floor processing device to move in reverse in conjunction with a planned movement route until the error no longer occurs and/or until a maximum number of attempts to process the specific area has been exceeded.

In the latter case, the specific area is no longer cleaned, so that floor processing can be continued in other areas. In addition, the change in operation can also involve adjusting the behavior of an actuator, for example the operation of a floor processing element of the floor processing device. This can relate to a rotational direction, a suction power or also a power consumption of an allocated drive motor.

It is further proposed that the control unit be set up to automatically control a change in operation of the floor processing device to avoid an error based upon a trial-and-error process, an evolutionary trial-and-error process, based upon defined rules, and/or based upon earlier changes in operation stored in a shared database of several floor processing devices. The found avoidance strategy can in turn be stored for future, similar error cases of the floor processing device. In the so-called evolutionary trial-and-error process, a found avoidance strategy is stored even if a reaction from a preceding pass (only) nearly would have led to an avoidance of the error. This can also be drawn upon as the basis for future error avoidances, in particular for defining a reference pattern. In addition, earlier patterns of the floor processing device or other floor processing devices stored in a shared data memory can also be alternatively or additionally drawn upon to arrive at an error forecast for the floor processing device. In addition, a rules-based adjustment of operating parameters of the floor processing device can take place, which are based upon empirical values during a period of development of the floor operating device. For example, this can entail turning off a cleaning unit if the power consumption rises too quickly, i.e., lies above a defined reference value. It can also be provided that a sensitivity of the detection unit or sensor of the detection unit be changed for the short term or long term, so as to possibly suppress the output of an alarm or increase the sensitivity, wherein a false alarm would then have to be accepted.

Apart from the described floor processing device, the invention also proposes a method for operating a floor processing device that automatically moves within an environment, wherein the floor processing device moves in the environment by means of a driving attachment, wherein a floor processing operation is executed by means of a floor processing unit, wherein an obstacle detection unit detects obstacles in the environment, wherein the floor processing device automatically navigates and self-localizes in the environment by means of a control unit, wherein a detection unit detects device parameters and/or environment parameters, and wherein the control unit determines an error of the floor processing device based upon the detected parameters that prevents the floor processing device from moving and/or the floor processing device from processing a surface to be processed in such a way that the floor processing device is unable to automatically extricate itself from the error situation, and wherein the control unit, for purposes of a self-learning error avoidance, analyzes the parameters detected by means of the detection unit with respect to recurring patterns, which are characterized by a repeatedly encountered combination of an error and at least one chronologically preceding environment and/or device parameter. The features and advantages described with reference to the floor processing device also correspondingly apply to the method according to the invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 4 is another exemplary error situation;

FIG. 5 is another exemplary error situation; and

FIG. 6 is a table with stored reference patterns and suggested changes in operation for a floor processing device.

DETAILED DESCRIPTION OF PREFERRED EMBODIMENTS

Figure 1:
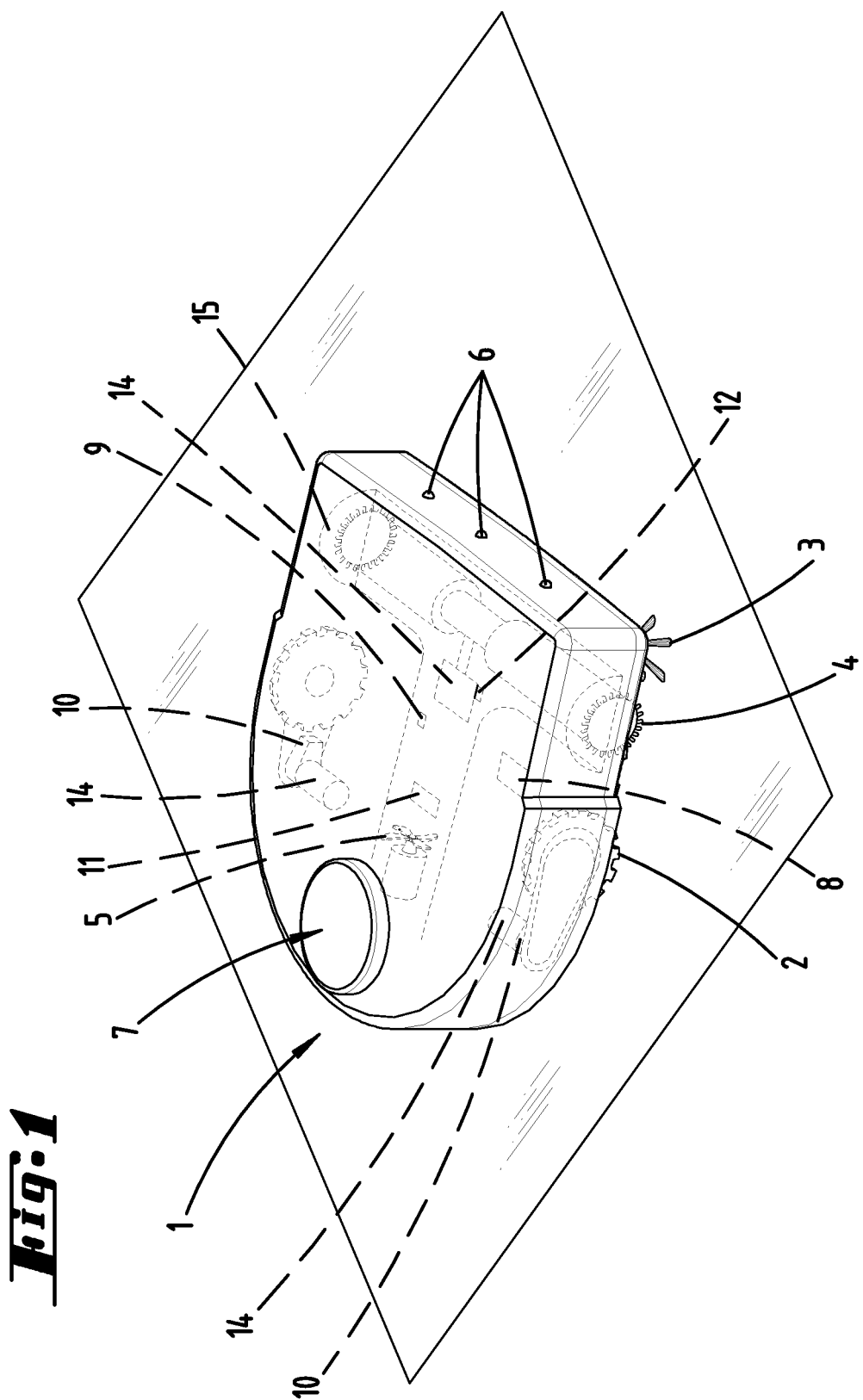
FIG. 1 is a floor processing device according to the invention.

FIG. 1 shows a floor processing device 1 that automatically moves within an environment, which here is designed as a vacuuming robot. The floor processing device 1 has a driving attachment 2 in the form of two wheels each driven by means of an electric motor 14. Each driving attachment 2 has allocated to it a detection unit 10 in the form of an odometry measuring unit, which measures a number of revolutions of the respective driving attachment 2. A stretch traversed by the floor processing device 1 can be determined from this. The floor processing device 1 further has a floor processing unit 3 in the form of a side brush that rotates around a vertical rotational axis, which has a plurality of bristle bundles that protrude over a contour of the floor processing device 1. In addition, the floor processing device 1 has a floor processing unit 4 in the form of a bristle roller that rotates around a horizontal rotational axis, which is here centrally driven by an electric motor 14, for example. The electric motor 14 has allocated to it a detection unit 12, which detects a power consumption of the electric motor 14. For example, the detection unit 12 can measure a current flow to the electric motor 14, from which the power consumption can in turn be calculated given a known operating voltage. The floor processing unit 4 is allocated to a suction channel 15, which extends up to a fan that comprises another floor processing unit 5. The fan exposes the suction channel 15 to a vacuum in the area of the bristle roller, so that suction material picked up from a surface to be cleaned can be vacuumed into a dust chamber (not shown).

The floor processing device 1 also has a navigation and self-localizing unit, which among other things comprises an obstacle detection unit 7. For example, the obstacle detection unit 7 is here designed as a laser triangulation measuring unit, which is arranged inside of the floor processing device 1 (not shown here), and outwardly emits a beam of light via reflecting elements. The obstacle detection unit 7 can preferably detect distances to obstacles in a 360° area around the floor processing device 1. For example, a control unit 8 generates an area map from the measured values, based upon which the floor processing device 1 can orient itself during a cleaning run. The current position and orientation of the floor processing device 1 can also be determined within the generated area map. Arranged on an exterior side of the floor processing device 1 are additional obstacle detection units 6, here for example in the form of ultrasound sensors, which enable an obstacle detection, for example in a plane lying outside of the measuring plane of the obstacle detection unit 7 (triangulation measuring device).

In addition to the detection unit 10 for odometry implementation and the detection unit 12 for determining a current power consumption of the electric motor 14 of the floor processing unit 4, the floor processing device 1 also has a detection unit 9 arranged in the suction channel 15, which is designed to measure a pressure, here for example an absolute pressure, inside of the suction channel 15. Another detection unit 11 of the floor processing device 1 has an IMU unit (inertial measuring unit), which is designed to detect an inclined position of the floor processing device 1. The detection unit 11 has a combination of several inertial sensors, here for example acceleration sensors.

The control unit 8 of the floor processing device 1 is designed to determine an error of the floor processing device 1 by evaluating the detection results of one or several detection units 9, 10, 11, 12. An error of the floor processing device 1 is on hand if a movement by the floor processing device 1 is blocked and/or a processing of the surface to be cleaned is prevented, without the floor processing device 1 being able to automatically extricate itself from the situation. For example, such an error situation can be present if the floor processing device 1 becomes jammed under an overhanging obstacle, e.g., a sofa or a shelf, and can no longer free itself via the driving force of the driving attachment 2. In another exemplary error situation, the driving attachment 2 of the floor processing device 1 loses contact with the surface to be cleaned, and can thus no longer move. This can happen when the floor processing device 1 drives onto a flat, narrow obstacle, for example a base portion of a swivel chair, and its chassis rests on the obstacle, so that the driving attachments 2 lose contact with the traversed surface. Additional error situations are conceivable, for example those that prevent a processing of the surface, for example because a floor processing unit 3, 4, 5 is blocked. For example, this can happen when objects are vacuumed that prevent the floor processing units 3, 4 from rotating or clog the suction channel 14.

In order to avoid error situations from the very outset, the floor processing device 1 or its control unit 8 is self-learning in design, so that error situations that arose in the past are analyzed, in order to develop measures for the future to prevent the same or similar situations during future activities of the floor processing device 1. For this purpose, the control unit 8 analyzes the data detected by means of the detection units 9, 10, 11, 12 when an error of the floor processing device 1 is determined. To this end, environment and/or device parameters detected immediately before and/or when an error occurs are evaluated. For example, data relating to a timeframe of a few seconds before the error occurs can be analyzed. Recommended in particular is the analysis of data from a time less than one minute before the occurrence of the error. Depending on the type of arising error, shorter time windows may also be sufficient for the analysis, for example 30 seconds, 20 seconds or 10 seconds prior to the occurrence of the error. Other timespans are likewise possible. In this conjunction, the control unit 8 can also be set up to initially detect the type of error, and then, depending on the type of detected error, determine a timespan whose accompanying data of the detection units 9, 10, 11, 12 are to be analyzed. For example, if an inclined position of the floor processing device 1 is detected, it is sufficient that the data analysis be performed over a shorter time interval prior to the occurrence of the error than given the occurrence of a blockade of the driving attachment 2 or a floor processing unit 3, 4, 5, for example, since it can usually take some time before an object gets caught inside of the suction channel 15 or on a floor processing unit 3, 4, 5 until a detectable blockade arises.

For purposes of achieving a self-learning behavior of the floor processing device 1, the previously stored data are analyzed in the event of an error situation of the floor processing device 1. Storage preferably takes place in a database, which contains the parameters detected by one or several detection units 9, 10, 11, 12 of the floor processing device 1 and/or detection units 16 of additional floor processing devices 1 (for example, see FIG. 4) on the one hand, and information about the type of error that arose on the other hand. Additional information can further be stored, for example a time at which the error occurred and/or the location at which the floor processing device 1 was before or when the error arose. Furthermore, a route followed by the floor processing device 1 beforehand can possibly be stored. Each error stored in the database can have allocated to it a proposed change in operation, which indicates how a repeated occurrence of the same error situation can be prevented. As a consequence, the database contains instructions as to what can be done to prevent the stored error from occurring in the first place.

The database can contain a pattern 13 (see FIG. 6) for a specific error situation of the floor processing device 1, which in subsequent cleaning runs of the floor processing device 1 can be compared with detected device and/or environment parameters, so as to prevent a renewed occurrence of the respective error. For purposes of self-learning error avoidance, the control unit 8 is in this regard set up to analyze the data detected by means of one or several detection units 9, 10, 11, 12, 16 for recurring patterns 13, which are characterized by a combination of an error and at least one device and/or environment parameter that repeatedly arises over time and/or by location. The control unit 8 can define a minimum for the number of times a specific error arises, which when exceeded causes a reference pattern 13 to be stored, which contains the parameters previously detected for the respective error, along with instructions to the control unit 8 as to which changes in operation to implement to prevent the imminent error. By contrast, if an error only arises once, it is assumed to be a coincidence that will not repeat itself in the future. It can be provided that a reference pattern 13 only be stored for an error if the latter was detected before at least two times, at least three times or even more frequently.

The changes in operation stored in the reference patterns 13 for the floor processing device 1 can be obtained empirically according to a trial-and-error process, i.e., can represent changes in operation that the floor processing device 1 has implemented in the past, and have proven to be successful in avoiding the error.

For example, changes in operation that can be used to avoid imminent errors include avoiding a specific area of an environment of the floor processing device 1, delaying the time at which a specific area of the environment is traversed by the floor processing device 1, moving in reverse along a previously traversed movement route to the current location of the floor processing device 1, changing a planned movement route, stopping a driven floor processing unit 3, 4, 5, changing a driving direction or power consumption of a floor processing unit 3, 4, 5. Other changes in operation are likewise possible. Combinations of changes in operation can also be suitable and defined for eliminating an error.

The device and/or environment parameters detected by the detection units 9, 10, 11, 12 of the floor processing device 1 or by other detection units 16 of other floor processing devices 1 can include the following, among others: A current movement route along which the floor processing device 1 is currently moving; a setting and/or operating status of a floor processing unit 3, 4, 5, i.e., for example a speed of the driving attachment 2 or a floor processing unit 3, 4, 5; an on/off status; a power consumption of one of the electric motors 14 allocated to the floor processing unit 3, 4, 5; a status or setting of the obstacle detection unit 6, 7; a spatial orientation of the floor processing device 1 in the environment; an acceleration or tilting of the floor processing device 1; an ambient temperature or device temperature; an ambient humidity; an operating temperature of an electric motor 14 of the floor processing device 1 and/or a floor processing unit 3, 4, 5; an absolute or relative pressure inside of the suction channel 15 of the floor processing device 1 and/or an ambient pressure. This list is not to be understood as final.

FIGS. 2 to 5 show various error situations for floor processing devices 1.

Figure 2:
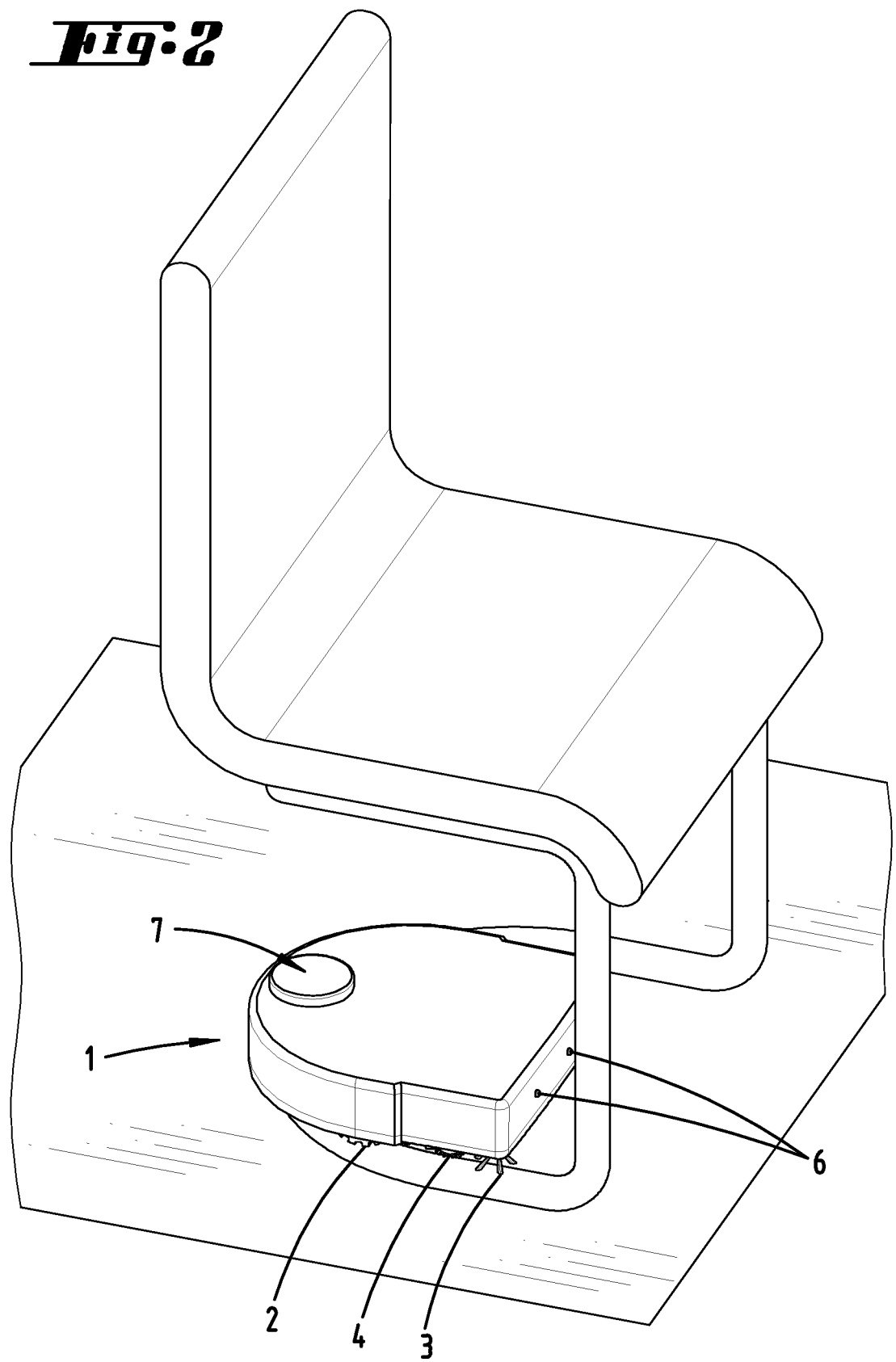
FIG. 2 is a first perspective view of a first error situation of a floor processing device.
Figure 3:
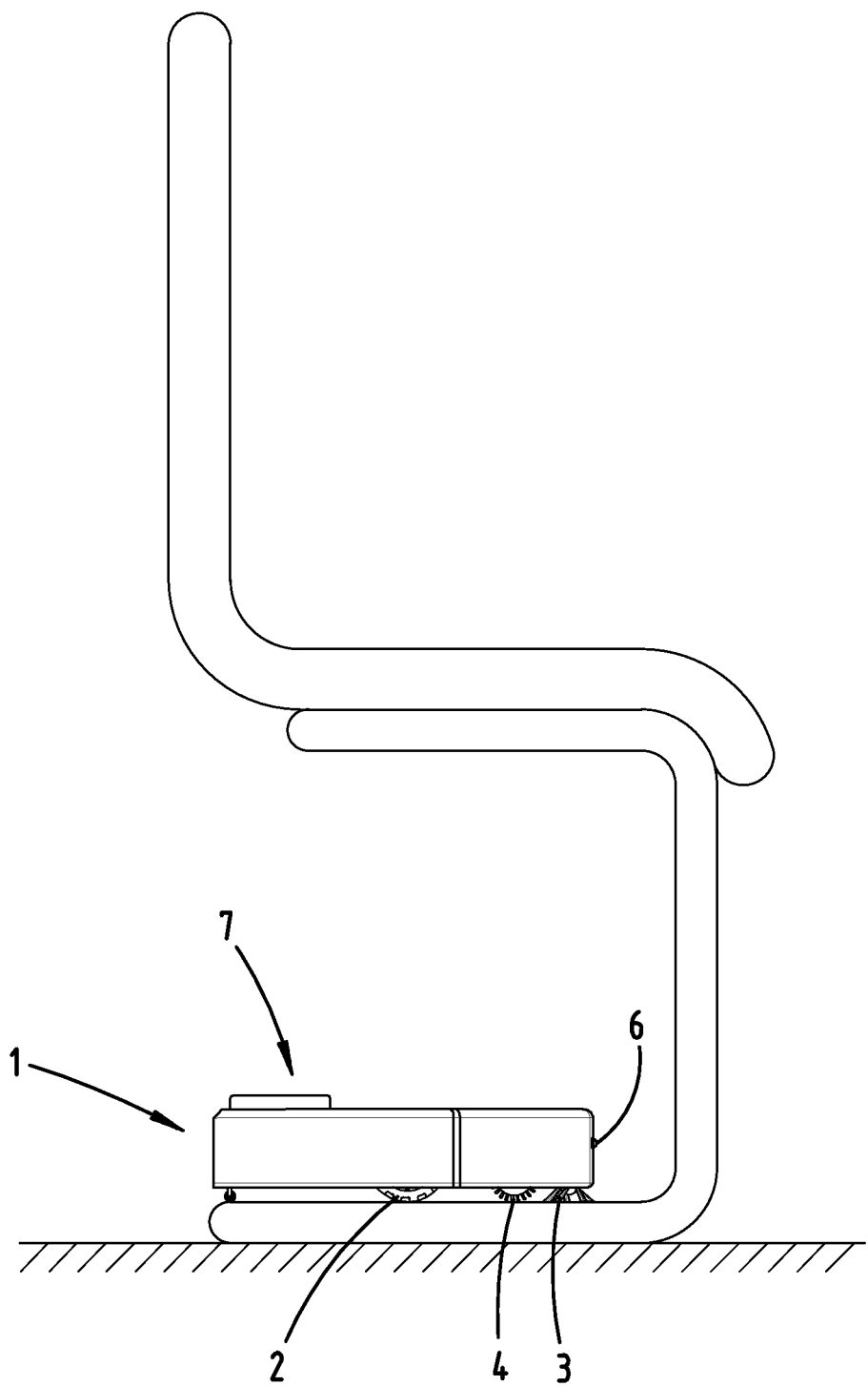
FIG. 3 is a second perspective view of the error situation according to FIG. 2.

On FIGS. 2 and 3, the floor processing device 1 according to FIG. 1 rests on a base frame of a swivel chair, thereby preventing a movement, because the floor processing device 1 cannot itself take measures to extricate itself from the error situation. Rather, it is necessary that a user extricate the floor processing device 1 from the situation and bring its driving attachments 2 back into contact with the floor surface, upon which the floor processing device 1 can continue moving. It goes without saying that such error situations of the floor processing device 1 should be avoided. This is why the situation of the floor processing device 1 is analyzed before the error arises to determine how this error could eventuate. The data detected by the detection units 9, 10, 11, 12 are used for the analysis, here specifically the device parameters detected by the detection unit 10 (odometry sensor) and detection unit 11 (IMU unit). In addition, information about the current position of the floor processing device 1 in the environment is drawn upon, which is recorded in an area map generated by means of the obstacle detection unit 7, here specifically the triangulation measuring device. Based upon the area map, the obstacle detection unit 7 determines that the floor processing device 1 is in a dining room, specifically in the area of a dining set with at least one swivel chair. The detection unit 10 detects an overrunning of the driving attachment 2, which is characterized by a rotation of the driving attachment 2 without a simultaneous change in position and/or orientation of the floor processing device 1 in the environment. The detection unit 11 uses the acceleration sensors located therein to detect that the floor processing device 1 is in an inclined position or drove itself into an inclined position in a span of time before the error occurred. If the latter recur another time during the operation of the floor processing device 1, the detection data of the detection units 10 and 11 are filed as a reference pattern 13 with the subsequently occurring error, so that the control unit 8 of the floor processing device 1 can compare current data of the detection units 10, 11 with stored reference patterns 13 in a later operation of the floor processing device 1, and likewise prevent a change in operation that would cause the floor processing device 1 to again come to rest on the base part of the swivel chair. A reference pattern 13 belonging to this error situation is stored in the uppermost line of the table according to FIG. 6. For example, the reference pattern 13 here contains the detected parameters for the floor processing device 1, specifically the detection values of the detection unit 10 "Overrunning of driving attachment 2" and the detection values of the detection unit 11 "Inclined position". In addition, the reference pattern 13 contains the allocated error that would be imminent given the occurrence of the aforementioned parameter, here specifically the loss of floor contact by the driving attachment 2. Also stored are the times at which the error arose in the past. Involved here is an error that does not occur at regular time intervals, so that the time can be any point in time. However, the occurrence of the error does depend on location, wherein the location where the error occurred is stored as "Dining room in the area of the dining set". The reference pattern 13 contains a proposed change in operation that is suitable for avoiding the error, here specifically the change in a planned movement route of the floor processing device 1. The change in operation filed in the reference pattern 13 is used to formulate a control command for the floor processing device 1 or for the control unit 8.

FIG. 4 shows another possible error situation, in which a floor processing device 1 with its driving attachment 2 travels in a liquid. This can cause the driving attachment 2 to overrun. The floor processing device 1 can have a detection unit 16, for example which detects excess liquid on the traversed surface. This detection unit can be a moisture sensor or a camera, which detects the accumulated water through corresponding image processing. Additionally or alternatively, a moisture sensor could likewise be arranged in the suction channel 15 of the floor processing device 1, which detects a siphoning of liquid into the suction channel 15. A reference pattern 13 can once again be created for this error as well, which contains the location where and time at which the liquid accumulation occurred. For example, it is possible that the time comes up regularly, e.g., on a regular date when the windows situated at the allocated location are to be cleaned or plants are to be watered. A proposed change in operation could [involve] turning off the fan (floor processing unit 5), changing the traveling route to avoid driving through the accumulated liquid, or the like.

FIG. 5 shows another error situation of a floor processing device 1, for which a reference pattern 13 is also stored on FIG. 6, specifically in the second line of the table. The error relates to a cable lying on the traversed surface being wound onto the floor processing unit 4. This error can be detected on the one hand by the detection unit 11, here specifically the IMU unit, and on the other by the detection unit 12, which detects a power consumption of the electric motor 14 that drives the floor processing unit 4. In the event that the detection unit 11 detects a bumping of the floor processing device 1 and the detection unit 12 simultaneously detects a continuous rise in the power consumption of the floor processing unit 4, a comparison with the reference pattern 13 makes it possible to determine that the error is imminent, that a cable is being wound around the floor processing unit 4 and blocking the latter. For example, the location filed in the reference pattern 13 can be a location in the environment where one or several cables are lying on the floor, e.g., an area of the living room where a speaker is located. The change in operation that serves to have the control unit 8 formulate a control command can indicate avoiding this area, for example, but the cable has already started being wound in, alternately turning the floor processing unit 4 back and forth, thereby loosening the cable from the floor processing unit 4. In addition, the floor processing unit 4 or its electric motor 14 can also be turned off completely, so that it a movement of the floor processing device 1 over the surface causes the cable to automatically fall off the floor processing unit 4.

Additional error situations are conceivable, which are signaled by specific parameters of the floor processing device 1 or its environment, and can thus be measured by the detection units 9, 10, 11, 12, 16 of the floor processing device 1. The last line of the table on FIG. 6 shows another exemplary situation, which is defined by a reference pattern 13. The error there involves a siphoning of objects, for example articles of clothing, lying on the surface being traversed by the floor processing device 1 into the suction channel 15 of the floor processing device 1. The siphoning of clothing articles or even a blockaded suction channel 15 is signaled by a rising vacuum within the suction channel 15, which can be measured by the detection unit 9 (pressure sensor). In addition, the power consumption of the electric motor 14 allocated to the floor processing unit 4 can rise if the article of clothing is already rubbing against the floor processing unit 4 and requires an increased power consumption for rotating the floor processing unit 4. The reference pattern 13 contains the time and location at which this error has arisen repeatedly in the past. The location is here a nursery, and the time is every day in the morning. A change in operation for avoiding the error could thus involve avoiding the nursery location at the defined time, specifically every morning.

As an alternative to having the control unit 8 automatically formulate a control command relating to an automatic change in operation of the floor processing device 1, the change in operation filed in the reference pattern 13 can also be displayed to inform a user on the display of the floor processing device 1 or on an external terminal having a communication link with the floor processing device 1. The user is thereby informed about an imminent malfunction of the floor processing device 1. This allows the user to him or herself determine a corresponding change in operation for the floor processing device 1, which preferably is thereupon stored in the respective reference pattern 13 and used to avoid the error given a repeated initiation of the same error case, i.e., the occurrence of identical or similar detection values of the detection units 9, 10, 11, 12, 16. Possible inputs by the user on the floor processing device 1 or a terminal having a communications link therewith can include manually teaching an approach strategy to the floor processing device 1 via remote control. The user can move the floor processing device 1 over the traversed surface, for example by way of an input on a touchscreen of the terminal or with his or her gestures or voice. The user can him or herself define specific device parameters so as to prevent the error case, for example specifically a rotational direction of the driving attachment 2 or floor processing unit 4. A selection of predefined possible changes in operation can also be displayed to the user, who can select a specific change in operation from the latter.

If the error repeats itself despite a change in operation, newly obtained measured data of the detection units 9, 10, 11, 12, 16 can be used to change or supplement the accompanying reference pattern 13 so as to make an error forecast more reliable. A change in operation can be defined based upon various reactions. For example, the proposed changes in operation can be based upon a trial-and-error process, wherein a found avoidance strategy can be stored for future, identical error cases. In addition, an evolutionary trial-and-error process may be present, in which just such an avoidance strategy is pursued, but with the proviso that a reaction from a preceding operation of the floor processing device 1 that nearly led to an avoidance of the error be taken as the basis for a renewed change in operation. Furthermore, empirical values for error avoidance can be derived from an external memory, for example a cloud. Alternatively or additionally, a rules-based adjustment of operating parameters can take place, which is based upon empirical values from a development period of the floor processing device 1. For example, one rule can here stipulate that only a very specific device parameter of the floor processing device 1 be changed, e.g., one that is more error-prone than the other device parameter.

The changes in operation can further be defined in such a way that an error is prevented by a floor processing device 1 not even approaching an area during an operation at all, or only once other areas of the environment have been cleaned. In addition, the floor processing device 1 can be moved in reverse according to its previous traveling path. Furthermore, the traveling path can be changed until the error no longer occurs, or a maximum number of repetitions has been exceeded without the error having been avoided.

Although only a few embodiments of the present invention have been shown and described, it is to be understood that many changes and modifications may be made thereunto without departing from the spirit and scope of the invention.

REFERENCE LIST

1 Floor processing device
2 Driving attachment
3 Floor processing unit
4 Floor processing unit
5 Floor processing unit
6 Obstacle detection unit
7 Obstacle detection unit
8 Control unit
9 Detection unit
10 Detection unit
11 Detection unit
12 Detection unit
13 Pattern
14 Electric motor
15 Suction channel
16 Detection unit

What is claimed is:

1. A floor processing device that automatically moves within an environment, comprising:
    a driving attachment configured for moving the floor processing device in the environment,
    a floor processing unit configured for executing a floor processing operation, an obstacle detection unit configured for detecting obstacles in the environment, a control unit configured for automatically navigating and self-localizing the floor processing device, and
    a detection unit configured for detecting device parameters and/or environment parameters,
    wherein the control unit is set up to determine an error situation of the floor processing device based upon the detected parameters that prevents the floor processing device from moving and/or prevents the floor processing device from processing a surface to be processed in such a way that the floor processing device is unable to automatically extricate itself from the error situation,
wherein, for purposes of a self-learning error avoidance, the control unit is set up to analyze the parameters detected by means of the detection unit with respect to recurring pattern that have a repeatedly encountered combination of an error and at least one chronologically preceding environment and/or device parameter,
    wherein the control unit is set up to analyze data with regard to recurring combinations of environment and/or device parameters recorded chronologically before the occurrence of an error and ensuing errors, and upon detection of a recurring combination to store the recurring combination as a reference pattern,
    wherein the control unit is set up to compare parameters detected during an ensuing floor processing and/or movement of the floor processing device with previously stored reference patterns,
    wherein the control unit is self-learning in design, so that given a match between currently detected parameters and one of the previously stored reference patterns, the control unit automatically controls a change in operation of the floor processing device to prevent an otherwise imminent error and/or to control an output information about the imminent error to a user to enable a manual action, and
    wherein the control unit is configured to store errors detected by the detection unit and preceding environment and/or device parameters in combination with time information as the reference pattern, wherein when an identical or similar error of the floor processing device occurs later at the same time, the control unit checks whether the same environment and/or device parameters of the floor processing device were present before or during the occurrence of the error, wherein the control unit is set up to only store a combination of an environment and/or device parameter and an error as the reference pattern if the error was detected at least two times in the past.

2. The floor processing device according to claim 1, wherein the control unit is configured to store errors detected by the detection unit and preceding environment and/or device parameters in combination with information about a position of the floor processing device in the environment.

3. The floor processing device according to claim 1, wherein the detection unit is set up to detect one or several environment and/or device parameters, selected from the following group: movement route of the floor processing device, setting and/or operating status of a floor processing unit and/or the obstacle detection unit, power consumption of an electric motor that drives the driving attachment and/or floor processing unit, rotational angle and/or rotational speed of the driving attachment, spatial orientation and/or inclination of the floor processing device, ambient temperature, ambient humidity, operating temperature of an electric motor and/or a floor processing unit of the floor processing device, pressure within a suction channel of the floor processing device, and ambient pressure.

4. The floor processing device according to claim 1, wherein the control unit is set up to detect one or several errors selected from the following group: blocking or overrunning of the driving attachment and/or floor processing unit, blocking of a suction channel, lifting of a partial area of the floor processing device from a surface to be processed, and immobilization of the floor processing device in the environment.

5. The floor processing device according to claim 1, wherein the control unit is set up to control one or more changes in operation of the floor processing device to prevent an otherwise imminent error, selected from the following group: avoiding a specific area of the environment, delaying the time of entry into a specific area of the environment, moving in reverse along a previously traversed movement route, changing a planned movement route, stopping a driven floor processing unit, changing a direction of movement, and power consumption of a floor processing unit.

6. A method for operating a floor processing device that automatically moves within an environment, wherein the floor processing device moves in the environment by means of a driving attachment, comprising:
- executing a floor processing operation by means of a floor processing unit, detecting obstacles in the environment with an obstacle detection unit,
- automatically navigating the floor processing device with the control unit and automatically self-localizing the floor processing device in the environment with the control unit,
- detecting with a detection unit device parameters and/or environment parameters,
- determining with the control unit an error of the floor processing device based upon the detected parameters that prevents the floor processing device from moving and/or the floor processing device from processing a surface to be processed in such a way that the floor processing device is unable to automatically extricate itself from the error situation, and wherein the control unit, for purposes of a self-learning error avoidance, and
- analyzing with a control unit the parameters detected by means of the detection unit with respect to recurring patterns that have a repeatedly encountered combination of an error and at least one chronologically preceding environment and/or device parameter,
- wherein the control unit analyzes data with regard to recurring combinations of environment and/or device parameters recorded chronologically before the occurrence of an error and ensuing errors, and upon detection of a recurring combination to store the recurring combination as a reference pattern,
- wherein the control unit compares parameters detected during an ensuing floor processing and/or movement of the floor processing device with previously stored reference patterns,
- wherein the control unit is self-learning in design, so that given a match between currently detected parameters and one of the previously stored reference patterns, the control unit automatically controls a change in operation of the floor processing device to prevent an otherwise imminent error and/or to control an output information about the imminent error to a user to enable a manual action, and
- wherein the control unit stores errors detected by the detection unit and preceding environment and/or device parameters in combination with time information as the reference pattern, wherein when an identical or similar error of the floor processing device occurs later at the same time, the control unit checks whether the same environment and/or device parameters of the floor processing device were present before or during the occurrence of the error, and wherein the control unit only stores a combination of an environment and/or device parameter and an error as the reference pattern if the error was detected at least two times in the past.

* * * * *